United States Patent
Ryu et al.

(10) Patent No.: US 8,780,299 B2
(45) Date of Patent: Jul. 15, 2014

(54) BACKLIGHT UNIT AND DISPLAY DEVICE HAVING THE SAME

(75) Inventors: Hohan Ryu, Suwon-si (KR); Taeseok Kim, Suwon-si (KR); MyoungGyun An, Cheonan-si (KR); Seung-Hyung Lee, Icheon-si (KR); Woondae Choi, Asan-si (KR)

(73) Assignee: Samsung Display Co., Ltd. (KR)

( * ) Notice: Subject to any disclaimer, the term of this patent is extended or adjusted under 35 U.S.C. 154(b) by 54 days.

(21) Appl. No.: 13/223,044

(22) Filed: Aug. 31, 2011

(65) Prior Publication Data

US 2012/0242930 A1 Sep. 27, 2012

(30) Foreign Application Priority Data

Mar. 24, 2011 (KR) .................... 10-2011-0026563

(51) Int. Cl.
*G02F 1/13357* (2006.01)
(52) U.S. Cl.
USPC .............. 349/65; 362/616; 362/617; 362/619
(58) Field of Classification Search
None
See application file for complete search history.

(56) References Cited

U.S. PATENT DOCUMENTS

| | | | |
|---|---|---|---|
| 7,667,788 B2 * | 2/2010 | Lee et al. | 349/65 |
| 2003/0058383 A1 * | 3/2003 | Jagt et al. | 349/65 |
| 2003/0156404 A1 * | 8/2003 | Lee | 362/31 |
| 2011/0090263 A1 * | 4/2011 | Kim et al. | 345/690 |

FOREIGN PATENT DOCUMENTS

| | | |
|---|---|---|
| JP | 2004-151559 A | 5/2004 |
| KR | 1020060098141 A | 9/2006 |
| KR | 1020070063747 A | 6/2007 |

* cited by examiner

*Primary Examiner* — Thanh-Nhan P Nguyen
(74) *Attorney, Agent, or Firm* — Innovation Counsel LLP

(57) ABSTRACT

Provided are a backlight unit and a display device having the same. The backlight unit includes a light source configured to generate light and a plurality of light guide members stacked so that individual surfaces of each light guide member contact a surface of another one of the light guide members, the plurality of light guide members configured to guide the light. Each of the light guide members includes a light incident for receiving incident light from the light source, an opposite surface facing an adjacent one of the light guide members, and a plurality of light path change patterns disposed on the opposite surface. Thus, brightness of the display device may be improved.

20 Claims, 7 Drawing Sheets

BACKLIGHT UNIT AND DISPLAY DEVICE HAVING THE SAME

CROSS-REFERENCE TO RELATED APPLICATIONS

This application claims priority under 35 U.S.C. §119 to Korean Patent Application No. 10-2011-0026563, filed on Mar. 24, 2011, the entire contents of which are hereby incorporated by reference.

BACKGROUND

1. Field of the Invention

The present disclosure relates generally to flat panel displays. More specifically, the present disclosure relates to a backlight unit having improved brightness, and a display device incorporating the same.

2. Description of the Related Art

Non-emissive type display devices, such as liquid crystal displays, typically employ a backlight unit for supplying light to the display panel.

The backlight unit includes a light source such as a cold cathode fluorescent lamp (CCFL) or a light emitting diode (LED). Also, the backlight unit incorporates this light source into a light guide unit for more uniform supplying of the light emitted from the light source to the entire display panel.

The backlight unit may further include other components to improve the brightness of light emitted from the light guide unit.

SUMMARY

The present disclosure provides a backlight unit having improved brightness and durability.

The present disclosure also provides a display device including the backlight unit.

Embodiments of the present invention provide backlight units including: a light source configured to generate light; and a plurality of light guide members stacked so that individual surfaces of each light guide member contact a surface of another one of the light guide members, the plurality of light guide members configured to guide the light. Each of the light guide members includes: a light incident surface for receiving incident light from the light source; an opposite surface facing an adjacent one of the light guide members; and a plurality of light path change patterns disposed on the opposite surface.

In some embodiments, the light guide members may include: a first light guide member including a first opposite surface and having a plurality of light path change patterns disposed on the first opposite surface; and a second light guide member including a second opposite surface facing the first opposite surface and having a plurality of light path change patterns disposed on the second opposite surface, wherein ones of the light path change patterns of the first light guide member are positioned in alternating manner with ones of the light path change patterns of the second light guide member.

In other embodiments, the light path change patterns extend along their respective opposite surfaces in a direction at least approximately perpendicular to the light incident surface.

In still other embodiments, each of the light path change patterns may have a prism shape. Also, the light path change patterns may each have the same shape.

In further embodiments, the first light guide member and the second light guide member may be coupled to each other to engage their respective light path change patterns with each other.

In yet other embodiments, the backlight units may further include a plurality of third light guide members disposed between the first light guide member and the second light guide member. The light path change patterns of the first opposite surface are first light path change patterns and the light path change patterns of the second opposite surface are second light path change patterns. Also, each of the third light guide members may include: a third opposite surface facing the first opposite surface; a plurality of third light path change patterns disposed on the third opposite surface, ones of the third light path change patterns positioned in alternating manner with ones of the first light path change patterns; a fourth opposite surface facing the second opposite surface; and a plurality of fourth path change patterns disposed on the fourth opposite surface, ones of the fourth light path change patterns positioned in alternating manner with ones of the second light path change patterns.

In further embodiments, the second light guide member may further include a light emission surface through which light incident to the light incident surface is emitted, the light emission surface facing the second opposite surface. Also, the backlight units may further include: a diffusion sheet facing the light emission surface of the second light guide member, the diffusion sheet configured to diffuse the light emitted through the light emission surface; and a reflection sheet facing the diffusion sheet with the light guide members positioned therebetween.

In still further embodiments, the first light guide member may further include a reflection surface facing the reflection sheet, and the reflection surface may be at least approximately parallel to the reflection sheet.

In even further embodiments, the second light guide member may further include a plurality of diffusion projections protruding from the light emission surface to diffuse the light emitted from the light emission surface. Here, the diffusion projections may be arranged at least approximately in a matrix configuration.

In yet further embodiments, the light source may include a plurality of light emitting diodes spaced a predetermined distance from each other. Here, the light incident surface may have a plurality of receiving grooves formed therein, and ones of the light emitting diodes may be inserted into corresponding ones of the receiving grooves.

BRIEF DESCRIPTION OF THE DRAWINGS

The accompanying figures are included to provide a further understanding of the inventive concept, and are incorporated in and constitute a part of this specification. The drawings illustrate exemplary embodiments of the inventive concept and, together with the description, serve to explain principles of the inventive concept. In the figures.

DETAILED DESCRIPTION OF THE EMBODIMENTS

Figure 1:
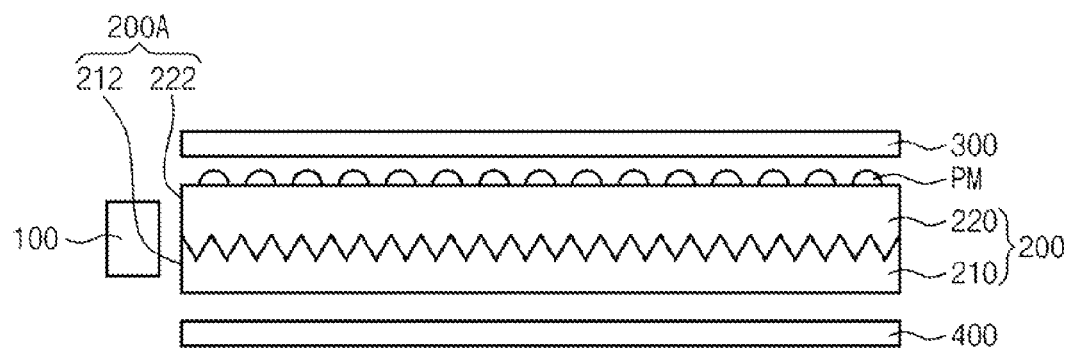
FIG. 1 is a sectional view of a backlight unit according to an embodiment of the inventive concept.

Since the inventive concept may have diverse modified embodiments, preferred embodiments are illustrated in the drawings and are described in the detailed description of the invention. However, this does not limit the inventive concept within specific embodiments and it should be understood that the inventive concept covers all the modifications, equivalents, and replacements within the idea and technical scope of the inventive concept.

Like reference numerals refer to like elements throughout. In the drawings, the dimensions and size of each structure are exaggerated, omitted, or schematically illustrated for convenience in description and clarity. It will be understood that although terms such as first and second are used herein to describe various elements, these elements should not be limited by these terms. Terms are only used to distinguish one component from other components. Therefore, a component referred to as a first component in one embodiment can be referred to as a second component in another embodiment. The terms of a singular form may include plural forms unless referred to the contrary.

The meaning of 'comprise', 'include', or 'have' specifies a property, a region, a fixed number, a step, a process, an element and/or a component but does not exclude other properties, regions, fixed numbers, steps, processes, elements and/or components. In the specification, it will be understood that when a layer (or film), a region, or a plate is referred to as being 'on' another layer, region, or plate, it can be directly on the other layer, region, or plate, or intervening layers, regions, or plates may also be present. In the specification, it will be understood that when a layer (or film), a region, or a plate is referred to as being 'under' another layer, region, or plate, it can be directly under the other layer, region, or plate, or intervening layers, regions, or plates may also be present.

Hereinafter, embodiments of the inventive concept will be described in detail with reference to the accompanying drawings.

Figure 2:
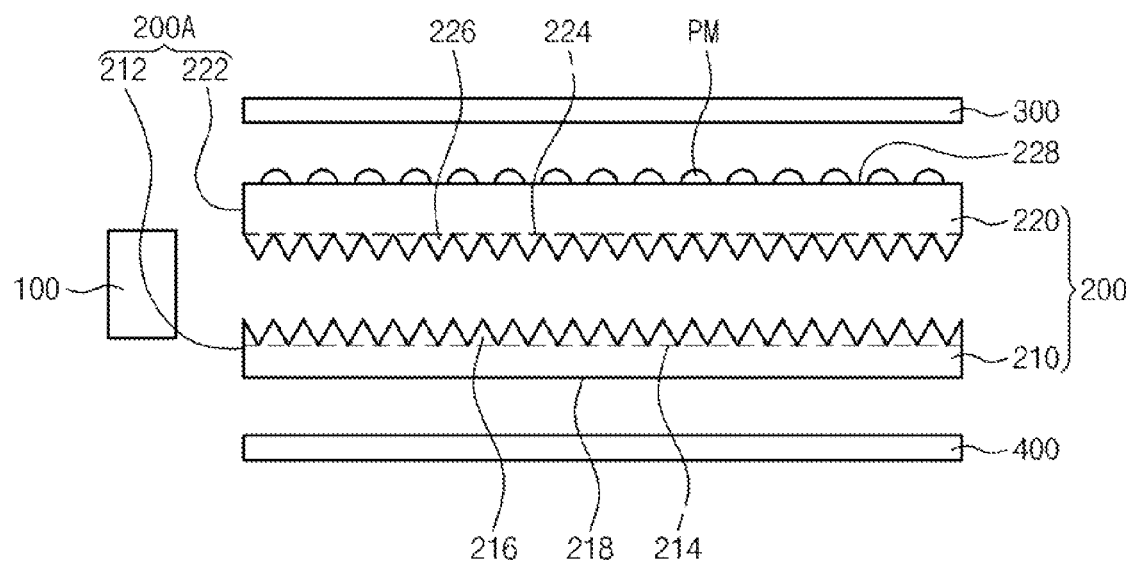
FIG. 2 is an exploded sectional view of the backlight unit of FIG. 1.
Figure 3A:
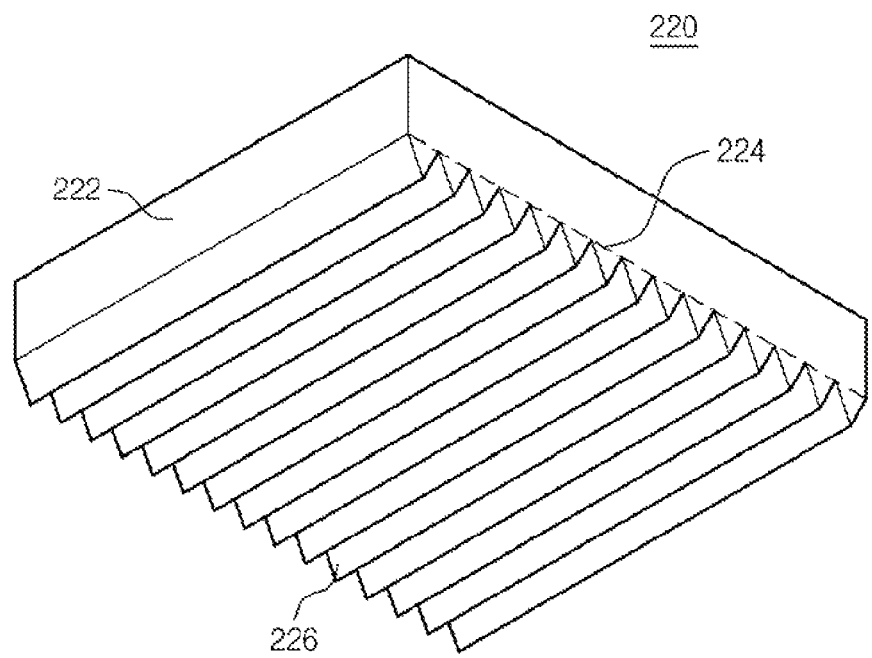
FIGS. 3A and 3B are perspective views illustrating one of light guide members included in the backlight unit of FIG. 2.
Figure 3B:
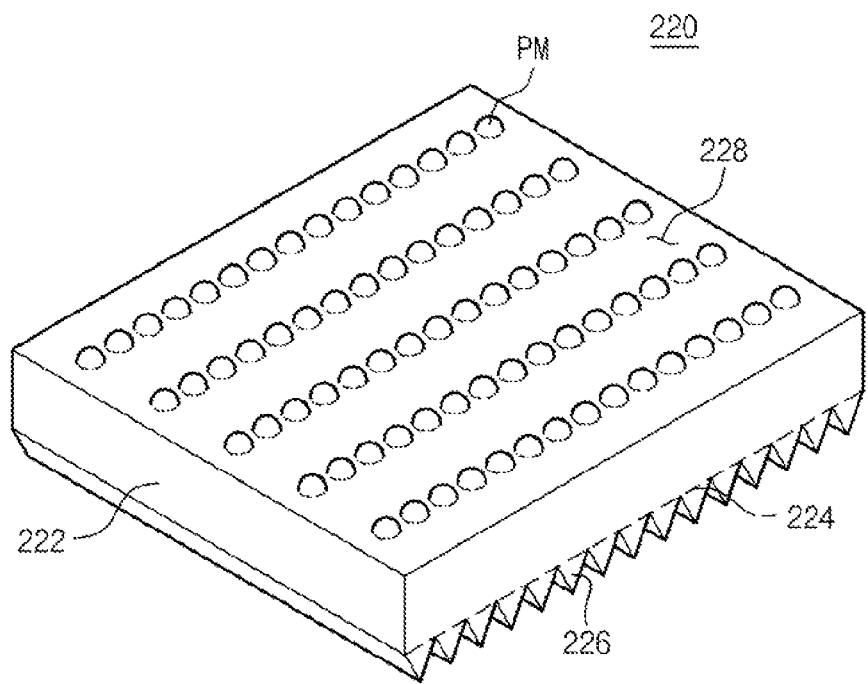
Figure 4:
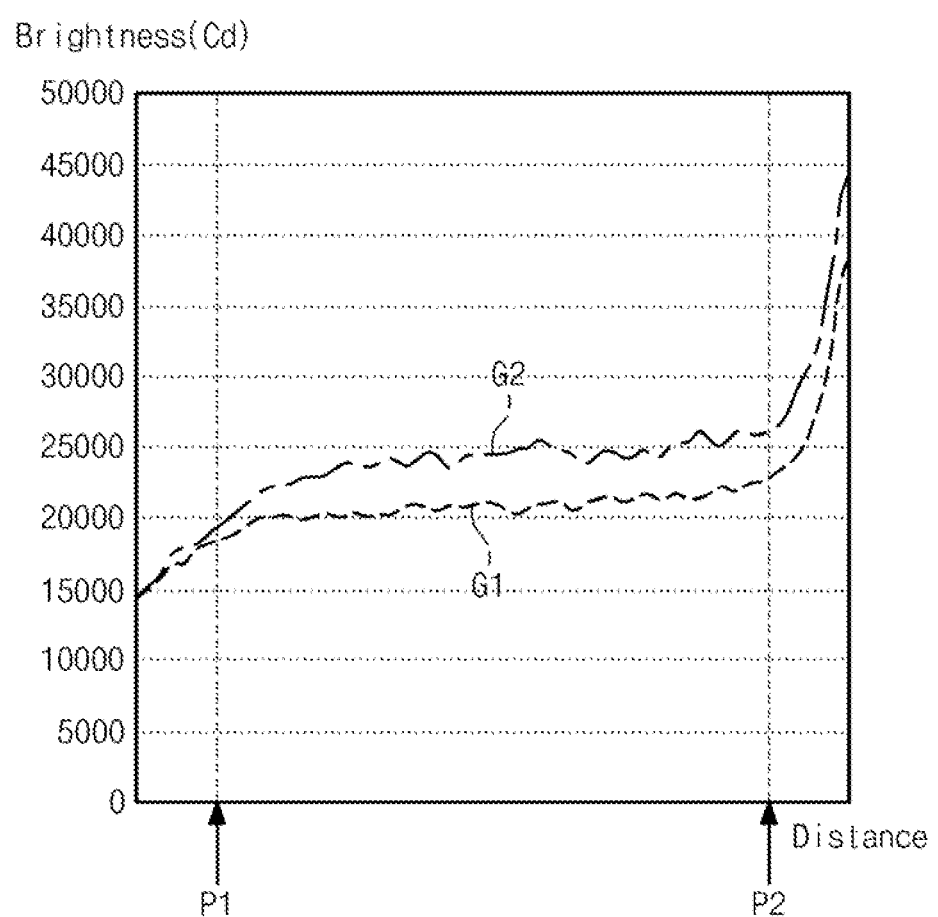
FIG. 4 is a graph illustrating brightness of the backlight unit of FIG. 1.

FIG. 1 is a sectional view of a backlight unit according to an embodiment of the inventive concept. FIG. 2 is an exploded sectional view of the backlight unit of FIG. 1. FIGS. 3A and 3B are perspective views illustrating one of the light guide members included in the backlight unit of FIG. 2. FIG. 4 is a graph illustrating brightness of the backlight unit of FIG. 1;

Referring to FIGS. 1 to 3, a backlight unit includes a light source 100 emitting light, and a light guide unit 200 guiding the light.

Light is emitted from the light source 100. The light source 100 is driven by power from an external source. As examples, a cold cathode fluorescent lamp (CCFL), an external electrode fluorescent lamp (EEFL), or a light emitting diode (LED) may be used as the light source 100. The light emitted from the light source 100 falls incident to the light guide unit 200. The light guide unit 200 collects the light emitted from the light source 100 to re-emit the collected light onto a non-emissive display panel.

The light guide unit 200 includes a plurality of successively stacked light guide members. The light guide unit 200 may be manufactured through injection molding, although any other suitable method may be employed instead. Here, the number of molds may be determined according to the number of light guide members. Also, the number of injection molding processes may be determined according to the number of light guide members. Each of the light guide members includes a light incident surface through which light is incident which faces the light source, an opposite surface facing an adjacent light guide member, and a plurality of light path change patterns disposed on the opposite surface.

As shown in FIGS. 1 to 3B, the light guide unit 200 may include two light guide members. That is, the light guide unit 200 may include a first light guide member 210 having a first opposite surface 214 and a second light guide member 220 having a second opposite surface 224 facing the first opposite surface 214. The light guide members 210 and 220 may be formed of the same material as each other. Each of the light guide members 210 and 220 may be formed of a transparent material having superior mechanical strength and thermal resistance. For example, each of the light guide members 210 and 220 may be formed of one of polycarbonate and polyacryl resins.

Also, the light guide unit 200 has a light incident surface 200A through which light generated in the light source 100 falls incident. The light incident surface 200A of the light guide unit 200 may be defined as light incident surfaces 212 and 222 of the light guide members 210 and 220 respectively, where each of the surfaces 212 and 222 faces the light source 100.

Each of the light guide members 210 and 220 includes a plurality of light path change patterns 216 and 226 which are respectively disposed on adjacent opposite surfaces 214 and 224. The light path change patterns 216 and 226 change light paths so that light incident from the light source 100 is provided to the display panel. Hereinafter, the light path change patterns will be described in further detail with reference to FIGS. 1 to 3B.

Referring to FIGS. 1 to 3B, the first light guide member 210 includes a plurality of first light path change patterns 216 disposed on the first opposite surface 214. Also, the second light guide member 220 includes a plurality of second light path change patterns 226 disposed on the second opposite surface 224 which faces the first opposite surface 214.

The first light path change patterns 216 and the second light path change patterns 226 are alternately arranged with respect to each other. Since the light path change patterns 216 and 226 are not exposed to the outside of the light guide unit 200 (or do not face outward from the light guide unit 200), the light guide unit 200 itself may help prevent the light path change patterns 216 and 226 from being damaged during the handling of the light guide unit 200.

Referring to FIGS. 3A and 3B, the first and second light path change patterns 216 and 226 are arranged in a direction generally perpendicular to that of a light incident surface 200A, and extend in a length direction of the light guide unit 200.

Here, as shown in FIGS. 3A and 3B, each of the light path change patterns 216 and 226 may have a prism shape. That is, in this exemplary configuration, each of the light path change patterns 216 and 226 has a prism shape with a generally triangular section taken along a direction perpendicular to the light incident surface 200A of the light guide unit 200. Although not shown, each of the light path change patterns 216 and 226 may also have other cross-sectional shapes, such as a square or semicircular prism shape.

Also, each of the individual first light path change patterns 216 has the same shape. Also, each of the individual second light path change patterns 226 has the same shape. Additionally, the first light path change patterns 216 and the second light path change patterns 226 may have the same shape as each other.

As shown in FIG. 1, the first light guide member 210 and the second light guide member 220 may be coupled to each other so that the first light path change patterns 216 are engaged with the second light path change patterns 226 (i.e., the light guide members 210, 220 are placed in contact with each other, with their light path change patterns 216, 226 interposed between each other). This configuration may prevent an air layer from forming between interfaces of the first and second light guide members 210 and 220, and this lack of an air layer or air bubbles helps to improve the brightness of light emitted from the light guide unit 200.

As shown in FIGS. 1 to 3, the backlight unit may further include a diffusion sheet 300 and a reflection sheet 400. The diffusion sheet 300 faces the reflection sheet 400, with the light guide unit therebetween.

The diffusion sheet 300 diffuses light emitted from the light guide unit 200. Furthermore, the second light guide member 220 faces the second opposite surface 224 and further includes a light emission surface 228 through which the light is emitted. Here, the diffusion sheet 300 faces the light emission surface 228 and is disposed above the second light guide member 220. Here, the light emission surface 228 may be flat.

The reflection sheet 400 reflects light leaking from the light guide unit 200 back into the light guide unit 200. Furthermore, the first light guide member 210 faces the first opposite surface 214 and further includes a reflection surface 218 reflecting the light reflected from the first light path change pattern 216 back toward the second light guide member 220. The reflection sheet 400 faces the diffusion sheet 300 with the light guide members 210 and 220 positioned therebetween, to reflect light leaking from the first light guide member 210 back toward the first light guide member 210. The reflection surface 218 may be flat.

Here, the light emission surface 228 may be parallel to the reflection sheet 400 and the reflection surface 218 may be generally parallel to the diffusion sheet 300, to reduce or minimize undesired optical effects caused by different light path lengths at different locations.

Also, a plurality of diffusion projections PM may be further disposed on the light emission surface 228 of the second light guide member 220. The light may pass through the diffusion projections PM before it is emitted from the light guide unit 200. Thus, the light may be refracted and diffused in a predetermined direction to further improve transmittance and brightness of light.

Each of the diffusion projections PM may be spaced a predetermined distance from adjacent diffusion projections PM. For this, as shown in FIG. 3B, the diffusion projections PM may be disposed generally in a matrix form. Although a 5×15 Matrix form is illustrated in FIG. 3B, the present disclosure is not limited thereto, and any number and layer of projections PM are contemplated.

FIG. 4 is a graph illustrating brightness of the backlight unit. Graph G1 denotes the measured brightness across the light exiting surface of a backlight unit including a conventional "single-light-guide-member" light guide unit, and graph G2 denotes the measured brightness across the light exiting surface of a backlight unit that employs a light guide unit constructed according to the light guide unit 200 illustrated in FIGS. 1 and 2. The zero point of the X-axis denotes a light incident surface of the light guide unit, and points P1 and P2 denote areas on which an image is displayed and boundary points into which light is provided. Also, the Y-axis denotes brightness in candelas per square meter.

From FIG. 4, it can be seen that the backlight unit employing the light guide unit 200 of FIGS. 1 and 2 has approximately 14% higher brightness as compared to the conventional single-light-guide-member backlight unit. This is done because the backlight unit of FIGS. 1 and 2 has lower leakage light and a higher reflective index in a direction of the diffusion sheet 300 when compared to the typical backlight unit that has only a single light guide member.

Figure 5A:
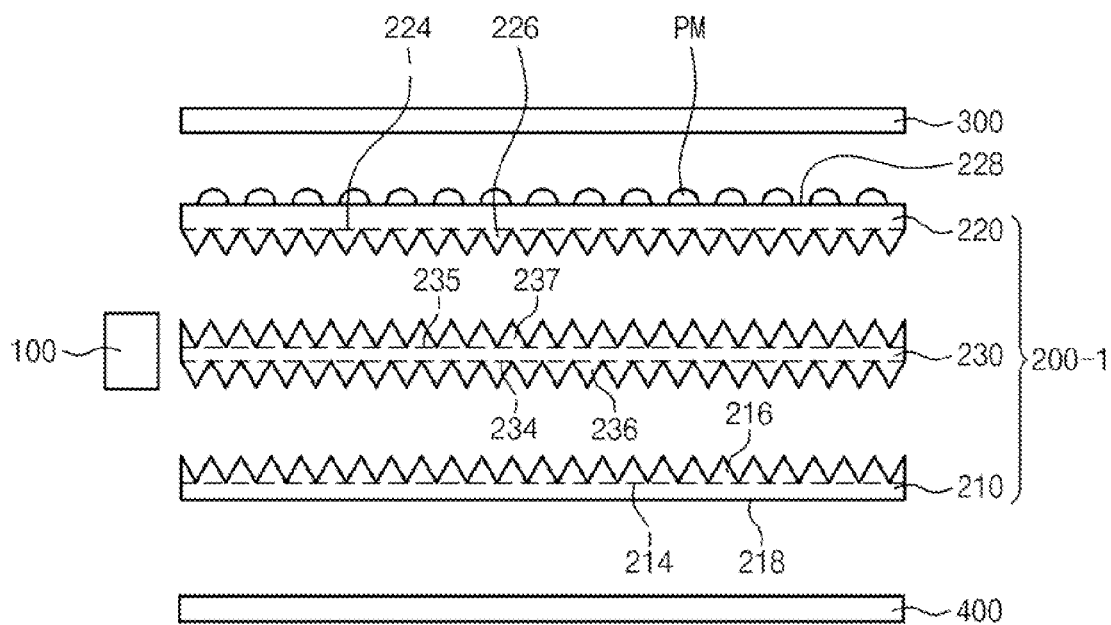
FIGS. 5A and 5B are exploded sectional views of a backlight unit according to another embodiment of the inventive concept.
Figure 5B:
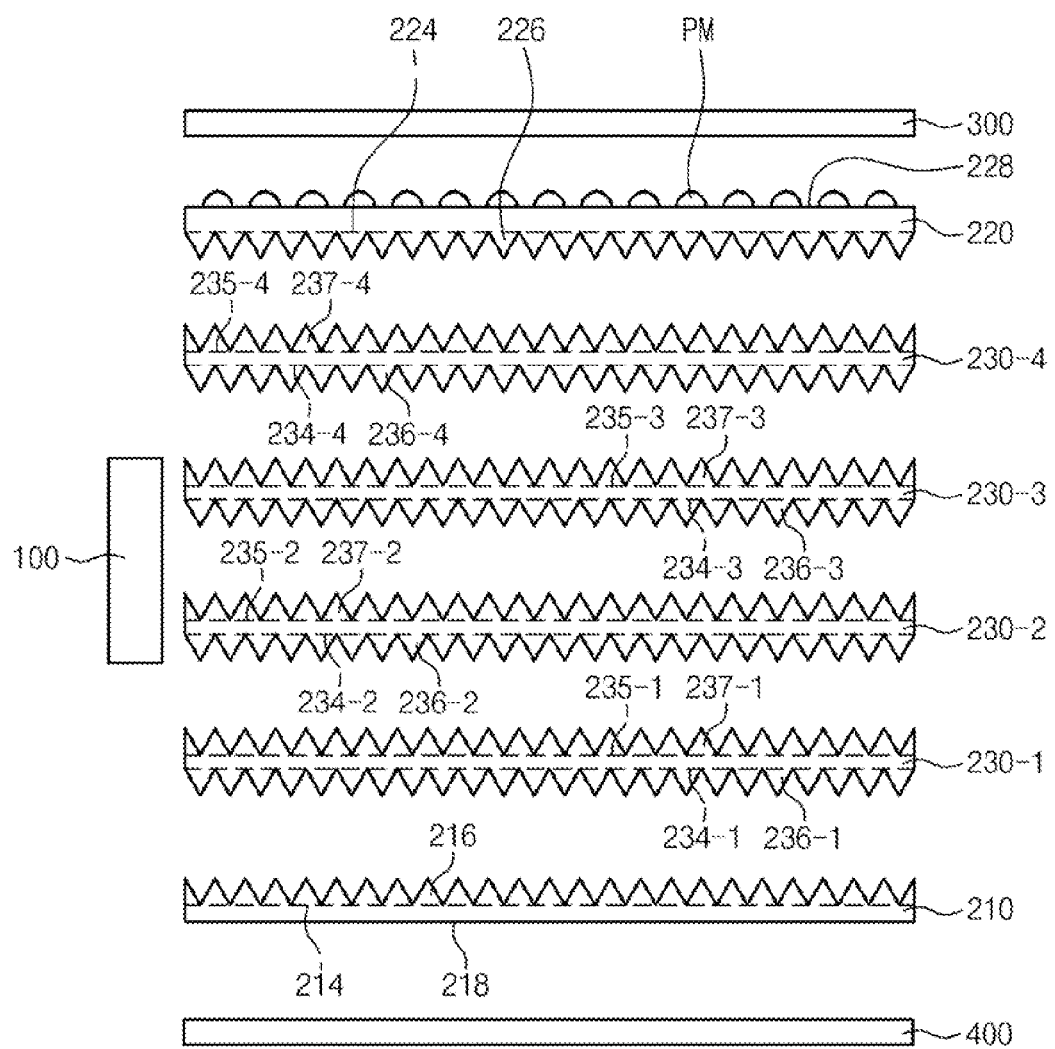

FIGS. 5A and 5B are exploded sectional views of a backlight unit according to another embodiment of the inventive concept. Hereinafter, a backlight unit according to another embodiment of the inventive concept will be described with reference to FIGS. 5A and 5B. However, descriptions of those elements already described with reference to FIGS. 1 to 3B will be largely omitted, for ease and clarity of explanation.

In the backlight unit according to the current embodiment, a light guide unit 200-1 further includes k (k is a natural number greater than 1) third light guide members 230 which are disposed between the first and second light members 210 and 220 (which, with reference to FIGS. 1 to 3B, have already been described) and successively stacked upon each other. Thus, the light guide unit 200-1 includes the first light guide member 210, the k third light guide members 230, and the second light guide member 220, which are successively stacked upon each other in order.

Here, each of the third light guide members 230 includes a plurality of light path change patterns 236 disposed on a third opposite surface 234 facing a first opposite surface 214 of the first light guide member 210. Also, each of the third light guide members 230 includes a plurality of fourth light path change patterns 237 disposed on a fourth opposite surface 235 facing a second opposite surface 224 of the second light guide member 220.

As shown in FIG. 5A, one third light guide member 230 may be provided. Alternatively, as shown in FIG. 5B, four third guide members 230-1 to 230-4 may be provided.

Here, the third light path change patterns 236 and the first light path change patterns 216 are alternately arranged with each other so as to interlock when the light guide members 210 and 230 are pressed against each other, and the fourth light path change patterns 237 and the second light path change patterns 226 are alternately arranged with each other so as to interlock when the light guide members 220 and 230 are pressed against each other.

Also, the third light path change patterns 236 and the fourth light path change patterns 237 are vertically arranged with respect to a light incident surface 200A (i.e. arranged to extend from surfaces 234, 235 substantially parallel to surface 200A; see FIG. 1) and extend in a length direction of the light incident surface 200A, like the first light path change patterns 216 and the second light path change patterns 226.

Each of the third light path change patterns 236 and the fourth light path change patterns 237 may have a prism shape, like that of each of the first light path change patterns 216. Also, the first light path change patterns 216, the second light path change patterns 226, the third light path change patterns 236, and the fourth light path change patterns 237 may have generally the same shape as each other.

Here, as shown in FIG. 5A, one third light guide member 230 is disposed between the first light guide member 210 and the second light guide member 220, and the light guide members 210, 220, and 230 are coupled to each other so that the first and third light path change patterns 216 and 236 are engaged with each other and the second and fourth light path change patterns 226 and 237 are engaged with each other.

That is, members 210 and 220 are pressed against member 230 so that members 210 and 220 both contact member 230, with their respective light path change patterns interlocking (e.g. individual light path change patterns 236 are placed in contact with light path change patterns 216 so that ones of the patterns 236 alternate with ones of the patterns 216).

As shown in FIG. 5B, when p (where p is a natural number greater than 2) third light guide members 230-1 to 230-4 are successively stacked between the first light guide member 210 and the second light guide member 220, a 1-th third light guide member 230-1 adjacent to the first light guide member 210 is coupled to the first light guide member 210 so that the first and third light path change patterns 216 and 236-1 are engaged with, or interlock with, each other. Also, a p-th (4-th in FIG. 5B) third light guide member 230-4 adjacent to the second light guide member 220 is coupled to the second light guide member 220 so that the second and fourth light path change patterns 226 and 237-4 are engaged with, or interlock with, each other.

Also, an n-th (where n is a natural number greater than 2 and less than p, p being a natural number greater than 3) third light guide member of p third light guide members is coupled to an n−1-th third light guide member so that the fourth light path change patterns of the n−1-th third light guide member and the third light path change patterns of the n-th third light guide member are engaged with, or interlock with, each other. The n-th third light guide member is coupled to an n+1-th third light guide member so that the third light path change patterns of the n+1-th third light guide member and the fourth light path change patterns of the n-th third light guide member are engaged with, or interlock with, each other.

For example, as shown in FIG. 5B, when four third light guide members 230-1 to 230-4 are provided, the 3rd third light guide member 230-3 is coupled to the 2nd third light guide member 230-2 so that the fourth light path change patterns 237-2 of the 2nd third light guide member 230-2 and the third light path change patterns 236-3 of the 3rd third light guide member 230-3 contact each other. Also, the 3rd third light guide member 230-3 is coupled to the 4th third light guide member 230-4 so that the third light path change patterns 236-4 of the 4th third light guide member 230-4 and the fourth light path change patterns 237-3 of the 3rd third light guide member 230-3 are engaged with each other.

As described above, since the third light guide members 230-1 to 230-4 are coupled to each other, the resulting configuration may prevent an air layer from being disposed between interfaces of the third light guide members 230-1 to 230-4. Thus, brightness of the light emitted from the light guide unit 200-1 may be improved.

Figure 6:
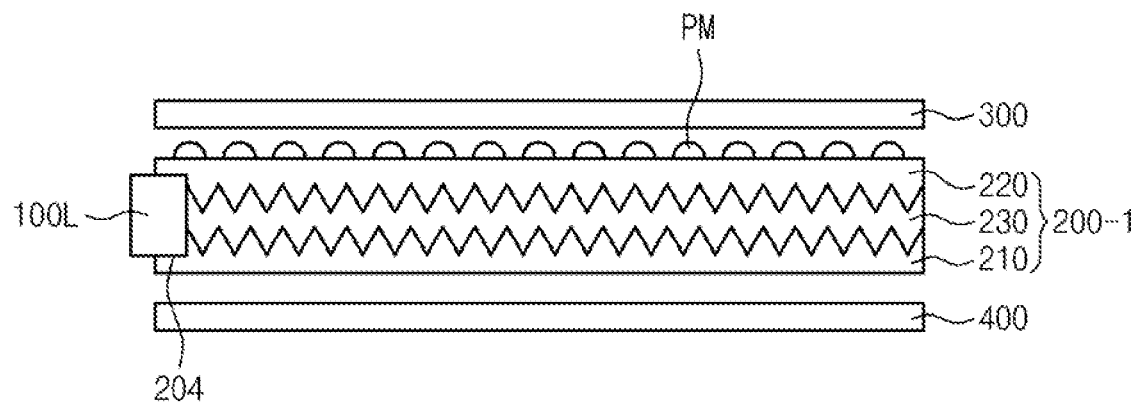
FIG. 6 is a sectional view of a backlight unit according to another embodiment of the inventive concept.
Figure 7:
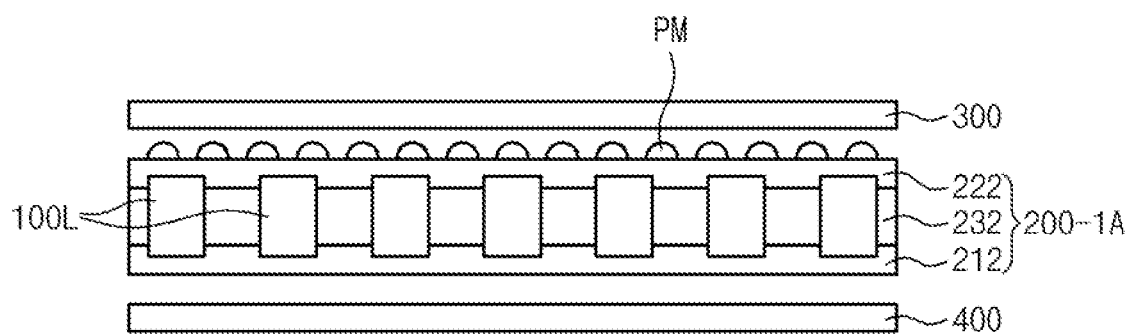
FIG. 7 is a side view of the backlight unit of FIG. 6.

FIG. 6 is a sectional view of a backlight unit according to another embodiment of the inventive concept, and FIG. 7 is a side view of the backlight unit of FIG. 6. Hereinafter, a backlight unit according another embodiment of the inventive concept will be described with reference to FIGS. 6 and 7. However, descriptions of those elements already described with reference to FIGS. 1 to 5 will be largely omitted.

According to the backlight unit illustrated in FIGS. 6 and 7, a light source 100 includes a plurality of light emitting diodes (LEDs) 100L. The LEDs 100L are semiconductor devices which respond to a driving voltage applied from an external source, so as to generate light. The LEDs 100L are characterized by relatively low power consumption, superior light intensity and longer life-cycle. Thus, each of the LEDs 100L may be used as a light source mounted on a printed circuit board (not shown) in a package form. While this embodiment of the invention contemplates the use of LEDs, the invention can alternatively employ any other source of illumination for light source 100.

As is known, each LED 100L uses compound semiconductor characteristics in which electrons and holes for generating the light are recombined with each other. Although not shown, each LED 100L has a structure in which an n-type semiconductor layer, an active layer, and a p-type semiconductor are successively stacked. Also, an LED 100L further includes a p-type electrode connected to the p-type semiconductor layer and an n-type electrode connected to the n-type semiconductor layer.

The LEDs 100L are spaced a predetermined distance from each other and sequentially arranged next to each other to provide light to the light guide unit 200-1. Since the LEDs 100L be arranged as described above, the LEDs 100L may more uniformly provide light to the light guide unit 200-1.

Each LED 100L may be attached to the light guide unit 200-1. A plurality of receiving grooves 204 disposed corresponding to the arrangement of the LEDs 100L are defined in a light incident surface 200-1A of the light guide unit 200-1. That is, the receiving grooves 204 are spaced a predetermined distance from each other and successively arranged, so that each groove 204 is configured to receive an LED 100L. Here, the LEDs 100L are one-to-one correspondingly inserted into the receiving grooves 204.

Since the LEDs 100L are one-to-one correspondingly inserted into the receiving grooves 204, the backlight unit may be easily handled. In addition, a coupling force between the LEDs 100L and the light guide unit 200-1 may be improved.

Figure 8:
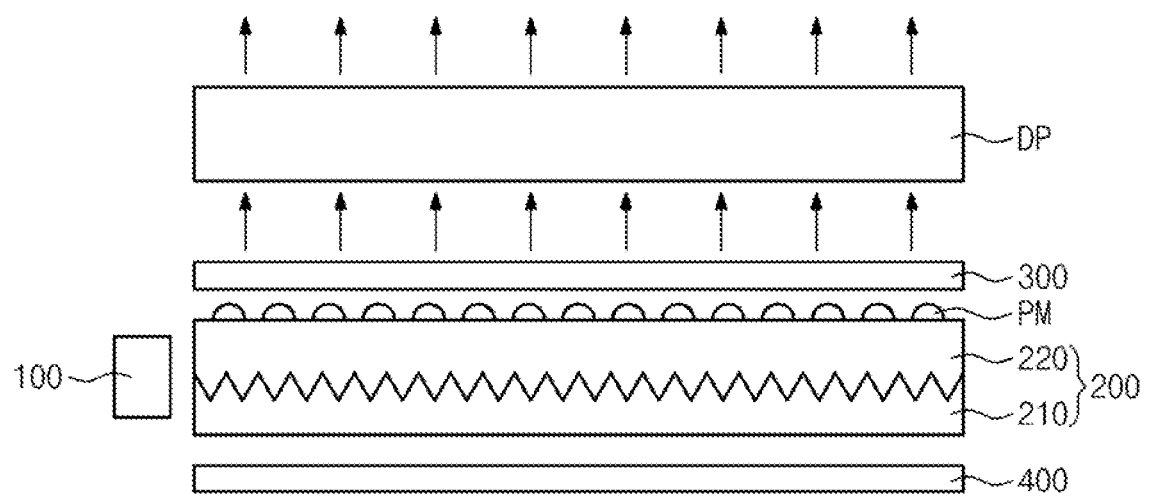
FIG. 8 is a sectional view of a display device according to an embodiment of the inventive concept.

FIG. 8 is a sectional view of a display device according to an embodiment of the inventive concept. Referring to FIG. 8, the display device includes the backlight unit and the display panel described with reference to FIGS. 1 to 7. However, only the backlight unit illustrated in FIG. 1 is illustrated in FIG. 8 as an example.

As shown in FIG. 8, light emitted from a light source 100 falls incident onto light guide members 200 through their light incident surfaces. The light guided by the light guide members 200 is emitted through a light emission surface of the uppermost light guide member 220 of the light guide members 200. A display panel DP disposed above the light guide members 200 receives the light emitted from the light guide members 200 to display an image.

A non-emissive display panel such as a liquid crystal display panel may be used as the display panel DP. In the case of a liquid crystal display panel, the display panel DP includes a first substrate including a plurality of gate lines, a plurality of data lines insulated and crossed with the gate lines, a plurality of pixel electrodes, and a plurality of thin film transistors. Also, the display panel DP may include a second substrate facing the first substrate and including a common electrode, with a liquid crystal layer disposed between the first substrate and the second substrate.

The display device includes the above-described backlight unit to improve brightness of the image displayed on the display panel DP. Also, since the light path change patterns disposed on the backlight unit are not exposed to the outside (i.e. are not positioned on an outer surface of the backlight unit), the number of defects in the display device may be reduced.

The light guide unit included in the backlight unit includes a plurality of light guide members which are sequentially stacked upon each other. Also, the light guide unit includes a plurality of light path change patterns disposed on each of the surfaces that face an of adjacent light guide member. When combined with each other, the brightness of the light emitted from the light guide members may be improved.

Also, since the light path change patterns are not exposed to the outside, this configuration may prevent the light path change patterns from being damaged.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A backlight unit comprising:
    a light source configured to generate light; and
    a plurality of transparent light guide members stacked so that one or more individual surfaces of each transparent light guide member contact a surface of another one of the transparent light guide members, the plurality of light guide members configured to guide the light,
    wherein each of the light guide members comprises:
        a light incident surface for receiving incident light from the light source;
        an opposite surface facing an adjacent one of the light guide members; and
        a plurality of light path change patterns disposed on the opposite surface; and
    wherein each light guide member is configured to transmit light from its light incident surface through the light path change patterns of its opposite surface;
    wherein the light guide members further comprise:
        a first light guide member comprising a first opposite surface and having a plurality of first light path change patterns disposed on the first opposite surface;
        a second light guide member comprising a second opposite surface facing the first opposite surface and having a plurality of second light path change patterns disposed on the second opposite surface; and
        at least one third light guide member disposed between the first light guide member and the second light guide member, wherein each third light guide member comprises:
            a third opposite surface facing the first opposite surface;
            a plurality of third light path change patterns disposed on the third opposite surface;
            a fourth opposite surface facing the second opposite surface; and
            a plurality of fourth light path change patterns disposed on the fourth opposite surface.

2. The backlight unit of claim 1,
    wherein ones of the light path change patterns of the first light guide member are positioned in alternating manner with ones of the light path change patterns of the second light guide member.

3. The backlight unit of claim 2, wherein the light path change patterns extend along their respective opposite surfaces in a direction at least approximately perpendicular to the light incident surface.

4. The backlight unit of claim 3, wherein each of the light path change patterns has a prism shape.

5. The backlight unit of claim 3, wherein the light path change patterns each have the same shape.

6. The backlight unit of claim 5, wherein the first light guide member and the second light guide member are coupled to each other to engage their respective light path change patterns with each other.

7. The backlight unit of claim 2, wherein the second light guide member further comprises a light emission surface through which light incident to the light incident surface is emitted, the light emission surface facing the second opposite surface, and
    wherein the backlight unit further comprises:
        a diffusion sheet facing the light emission surface of the second light guide member, the diffusion sheet configured to diffuse the light emitted through the light emission surface; and
        a reflection sheet facing the diffusion sheet with the light guide members positioned therebetween.

8. The backlight unit of claim 7, wherein the first light guide member further comprises a reflection surface facing the reflection sheet, and
    the reflection surface is at least approximately parallel to the reflection sheet.

9. The backlight unit of claim 8, wherein the second light guide member further comprises a plurality of diffusion projections protruding from the light emission surface to diffuse the light emitted from the light emission surface.

10. The backlight unit of claim 9, wherein the diffusion projections are arranged at least approximately in a matrix configuration.

11. The backlight unit of claim 1,
    wherein the third light path change patterns of one of the third light guide members are alternately arranged with the first light path change patterns; and
    the fourth path change patterns of one of the third light guide members are alternately arranged with the second light path change patterns.

12. The backlight unit of claim 11, wherein the third light path change patterns are arranged in a direction perpendicular to that of the light incident surface and extend in a length direction of the light incident surface, and
    the fourth light path change patterns are arranged in a direction perpendicular to that of the light incident surface and extend in the length direction of the light incident surface.

13. The backlight unit of claim 12, wherein the third light path change patterns have the same shape as each other and the fourth light path change patterns have the same shape as each other, and
    each of the third light path change patterns has the same shape as that of each of the fourth light path change patterns.

14. The backlight unit of claim 13, wherein each of the third and fourth light path change patterns has the same shape as that of each of the first light path change patterns.

15. The backlight unit of claim 14, wherein the first light guide member, the second light guide member, and the third light guide member are coupled to each other to engage the first and third light path change patterns with each other and to engage the second and fourth light path change patterns with each other.

16. The backlight unit of claim 14, wherein the third light guide member is provided in a plural number, and
    one of the third light guide members is coupled to the first light guide member so that its third light path change patterns are engaged with the first light path change patterns, and another one of the third light guide members is coupled to the second light guide member so that its fourth light path change patterns are engaged with the second light path change patterns.

17. The backlight unit of claim 16, wherein one third light guide member is coupled to two other third light guide members, so that the third light path change patterns of the one third light guide member are engaged with the fourth light path change patterns of one of the two other third light guide members, and the fourth light path change patterns of the one third light guide member are engaged with the third light path change patterns of the other of the two other third light guide members.

18. The backlight unit of claim 1, wherein the light source comprises a plurality of light emitting diodes spaced a predetermined distance from each other.

19. The backlight unit of claim 18, wherein the light incident surface has a plurality of receiving grooves formed therein, and ones of the light emitting diodes are inserted into corresponding ones of the receiving grooves.

20. A display device comprising:
- a backlight unit comprising a light source configured to generate light and a plurality of transparent light guide members stacked so that one or more individual surfaces of each transparent light guide member contact a surface of another one of the transparent light guide members, the plurality of light guide members configured to guide the light, wherein each of the light guide members comprises: a light incident surface for receiving incident light from the light source; an opposite surface facing an adjacent one of the light guide members; and a plurality of light path change patterns disposed on the opposite surface, each light guide member being configured to transmit light from its light incident surface through the light path change patterns of its opposite surface; and
- a display panel positioned to receive the light from the backlight unit so as to display an image;

wherein the light guide members further comprise:
- a first light guide member comprising a first opposite surface and having a plurality of first light path change patterns disposed on the first opposite surface;
- a second light guide member comprising a second opposite surface facing the first opposite surface and having a plurality of second light path change patterns disposed on the second opposite surface; and
- at least one third light guide member disposed between the first light guide member and the second light guide member, wherein each third light guide member comprises:
  - a third opposite surface facing the first opposite surface;
  - a plurality of third light path change patterns disposed on the third opposite surface;
  - a fourth opposite surface facing the second opposite surface; and
  - a plurality of fourth light path change patterns disposed on the fourth opposite surface.

\* \* \* \* \*